(12) United States Patent
Spindler et al.

(10) Patent No.: US 6,878,392 B2
(45) Date of Patent: *Apr. 12, 2005

(54) AERATED COMPOSITIONS, PROCESS AND APPARATUS FOR ACHIEVING SUCH AERATED COMPOSITIONS

(75) Inventors: Suzanne Mary Spindler, Bedford (GB); Loyd Wix, Bedford (GB)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 223 days.

This patent is subject to a terminal disclaimer.

(21) Appl. No.: 10/005,678

(22) Filed: Dec. 5, 2001

(65) Prior Publication Data

US 2002/0106434 A1 Aug. 8, 2002

(30) Foreign Application Priority Data

Dec. 6, 2000 (EP) .............................................. 00310834

(51) Int. Cl.$^7$ ............................. A23G 9/00; A23G 9/02; A23G 9/20
(52) U.S. Cl. ....................... 426/565; 426/586; 426/516; 426/522; 426/524; 62/342
(58) Field of Search ................................. 426/565, 586, 426/516, 522, 524; 62/342

(56) References Cited

U.S. PATENT DOCUMENTS

| | | | |
|---|---|---|---|
| 2,576,995 A | | 12/1951 | Carvel |
| 3,145,017 A | | 8/1964 | Thomas |
| 4,162,127 A | | 7/1979 | Wakeman et al. |
| 4,400,406 A | | 8/1983 | Morley et al. |
| 4,421,778 A | | 12/1983 | Kahn et al. |
| 4,434,186 A | * | 2/1984 | Desia et al. ................ 426/565 |
| 4,552,773 A | | 11/1985 | Kahn et al. |
| 4,798,734 A | | 1/1989 | Kaneda |
| 4,853,243 A | * | 8/1989 | Kahn et al. .................. 426/564 |
| 5,473,909 A | | 12/1995 | Kateman et al. |
| 5,919,510 A | | 7/1999 | Fayard et al. |
| 5,968,582 A | | 10/1999 | Vaghela et al. |
| 6,082,120 A | | 7/2000 | Hoffmann et al. |
| 6,613,374 B1 | * | 9/2003 | Fayard et al. ................ 426/565 |
| 6,635,300 B2 | * | 10/2003 | Adolphi et al. ............. 426/565 |

FOREIGN PATENT DOCUMENTS

| | | |
|---|---|---|
| DE | 538 187 | 7/1941 |
| DE | 89 08 631 | 11/1989 |
| DE | 197 50 677 | 6/1999 |
| EP | 0 191 487 | 8/1986 |
| EP | 0 332 287 | 9/1989 |
| EP | 0 559 316 | 9/1993 |
| EP | 001212948 A2 * | 6/2002 |
| FR | 2 745 153 | 8/1997 |
| GB | 371 406 | 4/1932 |
| GB | 530 180 | 12/1940 |
| GB | 2 019 187 A | 10/1979 |
| JP | 57 036943 | 6/1982 |
| JP | 57 063053 | 7/1982 |
| JP | 57 068742 | 8/1982 |
| WO | 00/70961 | 11/2000 |

OTHER PUBLICATIONS

European Search Report mailed May 29, 2001.
European Search Report on EP 01 30 9242 dated Nov. 6, 2003.
European Search Report on EP 01 30 9241 dated Feb. 25, 2002.
European Search Report on EP 00 31 0835 dated Jul. 6, 2001.
Turkish Search Report on Application No. 2001/03524.

* cited by examiner

Primary Examiner—N. Bhat
(74) Attorney, Agent, or Firm—Gerard J. McGowan, Jr.

(57) ABSTRACT

The present invention provides a composition comprising a fat phase and having overrun of at least 90%, characterized in that at least 50 w/w % of said fat phase is liquid at −5° C. The invention particularly relates to such compositions in the form of an ice cream. The invention also provides a process for the preparation of a composition, wherein said process comprises aerating a mix comprising a fat phase in a freezer barrel enclosing an internal volume, said internal volume comprising an aeration means, wherein said aeration means displaces less than 40% of said internal volume, characterized in that at least 50 w/w % of said fat phase is liquid at −5° C.

5 Claims, No Drawings

AERATED COMPOSITIONS, PROCESS AND APPARATUS FOR ACHIEVING SUCH AERATED COMPOSITIONS

TECHNICAL FIELD OF THE INVENTION

The invention relates to aerated food compositions. More particularly the invention relates to aerated ice cream compositions which comprise a fat component having a low melting point and thereby retaining liquid properties at processing temperatures. The invention further relates to a process for preparing such compositions and the use of particular apparatus in said process.

BACKGROUND TO THE INVENTION

It is known to aerate a mix for the preparation of an ice cream through the use of an aerating means comprising a rotating element that fits into the barrel of a continuous ice cream freezer. This aerating means is commonly referred to as a dasher. On rotation the dasher transfers mechanical energy into the mix in order to achieve aeration and generate a fat network by aggregating some of the fat droplets. This aggregation is necessary for product stability.

For many industrial continuous freezers there are a variety of dasher types available. These can be differentiated from each other by the volume displaced within the freezer barrel which can be assessed by simply filling the freezer barrel with a liquid, such as water, and measuring the volume of liquid displaced when the dasher is fitted therein. A dasher described as a series 80 indicates that this rotating element occupies 80% of the available internal volume of the freezer barrel so that only 20% of the space is available to be occupied by the mix to be aerated. By contrast a series 15 dasher, also known in the art, demonstrates a displacement volume of only 15% of the internal barrel volume, the remaining 85% being available to be occupied by a mix to be aerated.

In conventional ice cream processing it is generally accepted that higher displacement dashers such as the series 80 give rise to high quality ice cream being highly churned (Ice Cream 5$^{th}$ Edition, W. S. Arbuckle et al., page 183) thus showing optimal levels of fat de-stabilisation, while at the same time product dryness, good meltdown resistance and product hardness. These displacement dashers are therefore the standard form of aerating means used in ice cream manufacture.

The ice cream formulations prepared by conventional aeration comprise a fat phase with a relatively high melting point. This means that little if any liquid fat is present at the processing temperature.

The applicants have identified a need to extend the range of fats that can be applied to ice cream manufacture. In particular there is a need for the development of novel ice cream compositions having formulations that can comprise a fat component with a low melting point, thus imparting a higher level of liquid fat in the fat phase, at the processing temperature. At the same time formulations must maintain the high degree of stable aeration and low levels of destabilised fat and overrun loss, characteristic of conventional ice creams. The ability to use increasingly varied fats would also allow the manufacture of ice cream at reduced cost.

Unexpectedly it has been found that the full range of conventional techniques described above for processing ice cream are not suitable for this group of novel ice cream formulations. The use of high displacement aerating means has been found by the applicants to lead to the development of a product exhibiting over destabilisation of fat and overrun loss, phase separation, leading to a clearly unsatisfactory product.

The technical problem to be solved by the present invention is therefore derived from the finding that novel ice cream formulations comprising a fat phase with relatively high levels of liquid fat at the processing temperature cannot be processed to a high quality ice cream by conventional routes.

It has been surprisingly been found that a solution to this problem resides in the use of equipment which had never been used for this type of formulation before. There is no suggestion in the prior art that this type of equipment has any positive influence on the destabilisation of fat, phase separation or overrun loss during the processing of a composition. The present invention therefore seeks to provide a stable composition with at least 90% overrun, wherein said composition comprises a fat phase which has a high ratio of liquid fat to solid fat.

TESTS AND DEFINITIONS

Levels of liquid fat can be determined by $^{13}$C-NMR spectroscopy wherein the liquid fat level of an emulsion of an ice cream mix of the invention is determined.

Measurements carried out at −5 & +50° C. for 100% fully liquid state. $^{13}$C-NMR is carried out on a Bruker AMX-400 high resolution NMR spectrometer, with 10 mm sample tubes. Data is acquired with inverse gated proton de-coupling and suitable interscan delay to ensure quantitative results. Volume of samples for 100% liquid measurement was reduced to keep total sample within probe coils and hence negate any complications due to premix separation. Measurements at −5° C. is carried out after external equilibration for at least 2 hrs. 100% liquid measurements is carried out after at least 30 min equilibration, at +50° C., in spectrometer probe. All temperatures verified using external thermocouple meter. Liquid fat content is determined by integration of fat signals (15–40 ppm), relative to integral of sugar signals (60–85 ppm). At −5° C. and above the integral of sugar signals will remain constant and hence can be used as an internal standard. The proportion of liquid fat at the chosen temperature is calculated by comparison of integrals with those from fat signals from the 100% "melted" sample.

For the purpose of the invention overrun can be determined as described in Ice Cream 4$^{th}$ Edition, Arbuckle et al. page 181.

BRIEF DESCRIPTION OF THE INVENTION

It is a first object of the present invention to provide a composition comprising a fat phase and having an overrun of at least 90%, characterised in that at least 50% weight by weight of said fat phase is liquid at −5° C.

In a preferred embodiment the composition of the invention is an ice cream.

In the light of conventional teachings that an aerating means that displaces 80% of freezer barrel volume is most suited to giving the best quality ice cream in terms of optimal fat de-emulsification, product dryness, good meltdown resistance and product hardness; it is unexpected to find that the novel compositions of the invention cannot be processed to an ice cream by this route.

It has been found that the use of a high displacement aerating means will lead to unacceptable levels of destabilised fat in the formulations of the invention due to the reduced residence time of the mix in the freezer barrel It is a second object of the invention to provide a process for the preparation of a composition, wherein said process comprises aerating a mix comprising a fat phase, in a freezer barrel enclosing an internal volume, said internal volume comprising an aeration means, wherein said aeration means displaces less than or equal to 40% of said internal volume, characterised in that at least 50% weight by weight of said fat phase is liquid at −5° C.

By way of the present invention a process has been devised as described above wherein a selected displacement range for the aerating means of less than 40% of the internal freezer barrel volume, has been found to yield a stable aerated ice cream demonstrating good properties. These properties include low fat de-emulsification, product dryness, good meltdown resistance and product hardness for the novel compositions provided herein.

Through the use of an aerating means that displaces less than 40% of internal freezer barrel volume it has been possible to achieve aeration levels in excess of 90% overrun for a mix having at least 50% w/w of its fat phase in a liquid state at −5° C.

It is preferred that the aerating means used for the purpose of the invention displaces at least 10% of the internal barrel volume, more preferably at least 15%, most preferably the aerating means displaces from 15 to 30% of the internal freezer barrel volume. Suitable aeration means are commercially available from the manufacturer WCB.

A composition of the invention may comprise a fat phase derived from any fat source having a low melting point, defined by a proportion of at least 50% w/w liquid fat at −5° C. Preferably the proportion of the fat phase that is liquid at −5° C. is less than 55% w/w of the phase when in an emulsified state. Preferably the fat phase comprises one or more fats selected from the group comprising soy bean oil, palm oil, walnut oil, pistachio oil, hazelnut oil, hydrogenated or partially hydrogenated sunflower oil.

The total fat content of the composition may range from 3% w/w to 15% w/w, preferably 5 to 10% w/w. Most preferred the fat content of a composition according to the invention is about 8% w/w.

Preferably compositions of the invention have an overrun of at least 100%, more preferably the level of overrun is at least 110%. In a particularly preferred embodiment a composition according to the invention is an ice cream.

The ice cream compositions of the invention as described above may be subsequently undergo storage in a standard freezer at −18° C.

It is recognised that as the proportion of liquid fat in the fat phase increases it becomes more preferable to choose a aerating means towards the lower end of the displacement range. This increases the residence time of the mix in the freezer barrel and thereby allows a longer and more effective aeration period without destabilisation of the fat.

A third object of the invention provides for the use of a aerating means that displaces less than 40% of a freezer barrel internal volume in the aeration of a composition comprising a fat phase and having an overrun of at least 90%, characterised in that at least 50% weight by weight of said fat phase is liquid at −5° C.

DETAILED DESCRIPTION

EXAMPLE 1

500 kg of an ice cream mix A was prepared with the composition indicated in table 1. The mix was made in a large scale mix plant at a temperature of approximately 65–70° C., wherein the order of ingredients into the tank was water, skimmed milk powder, sugars and stabilisers/emulsifier compounds (suitably Cremodan™ SE 019 available from Danisco™ ingredients) and fats/oils. MD40 is a refined and spray dried glucose syrup in powder form having 40% dextrose equivalent and is sold as Cerestar™ or Morsweet™. The mix was homogenised at $1.379 \times 10^7$ Nm$^{-2}$ i.e. 138 Bar (2000 psi) and then pasteurised at 83° C. for 15 seconds. Following pasteurisation the mixture was immediately chilled to approximately 4° C. and aged in a ageing tank for at least 2 hours.

According to the methodology described above the level of liquid fat at the processing temperature of −5° C. was 53 w/w of the fat phase.

TABLE 1

| Mix A | |
|---|---|
| Ingredient | Weight % |
| Sucrose | 13.61 |
| Walnut oil | 2.86 |
| Skimmed milk powder | 10.08 |
| MD40 | 4.05 |
| Butter fat | 5.14 |
| Cremodan SE 019 | 0.45 |
| Water | 63.81 |

Mixes prepared as described and according to the above formulation were separately processed through freezer barrels comprising an aerating means of 15, 30 and 80% displacement of the internal volume of the barrel.

It was found that with an aerating means of 15% or 30% displacement mix A could be processed to a composition having an overrun of at least 90%. On hardening in a standard freezer at −18° C. this composition gave rise to an ice cream with good organoleptic properties showing a creamy texture with little or no ice and no phase separation or unacceptable level of fat destabilisation.

In contrast where mix A was processed to an overrun of 90% by aeration with an aerating means showing 80% displacement of the freezer barrel, the resulting ice cream had very poor oral properties showing a high degree of phase separation and over destabilisation of fat, in addition to a very icy undesirable texture.

What is claimed is:

1. A composition comprising a fat phase and having overrun of at least 90%, characterised in that at least 50% w/w of said fat phase is liquid at −5° C.

2. A composition according to claim 1, wherein said composition is an ice cream.

3. A process for the preparation of a composition, wherein said process comprises aerating a mix comprising a fat phase in a freezer barrel enclosing an internal volume, said internal volume comprising an aeration means, wherein said aeration means displaces less than 40% of said internal volume, characterised in that at least 50% w/w of said fat phase is liquid at −5° C.

4. A process according to claim 3, wherein said mix is aerated to an overrun of at least 90%.

5. A process according to claim 3 wherein said composition is an ice cream.

* * * * *